US012646421B2

(12) United States Patent
Sato

(10) Patent No.: US 12,646,421 B2
(45) Date of Patent: Jun. 2, 2026

(54) METHODS TO ASSIST VERBAL COMMUNICATION FOR BOTH LISTENERS AND SPEAKERS

(71) Applicant: Hiroki Sato, Copenhagen (DK)

(72) Inventor: Hiroki Sato, Copenhagen (DK)

( * ) Notice: Subject to any disclaimer, the term of this patent is extended or adjusted under 35 U.S.C. 154(b) by 194 days.

(21) Appl. No.: 17/909,622

(22) PCT Filed: Mar. 4, 2020

(86) PCT No.: PCT/DK2020/050058
§ 371 (c)(1),
(2) Date: Sep. 6, 2022

(87) PCT Pub. No.: WO2021/175390
PCT Pub. Date: Sep. 10, 2021

(65) Prior Publication Data
US 2023/0122715 A1 Apr. 20, 2023

(51) Int. Cl.
*H04R 29/00* (2006.01)
*G09B 21/04* (2006.01)
(52) U.S. Cl.
CPC ........... *G09B 21/04* (2013.01); *H04R 29/004* (2013.01); *H04R 29/008* (2013.01)
(58) Field of Classification Search
None
See application file for complete search history.

(56) References Cited

U.S. PATENT DOCUMENTS

| | | | |
|---|---|---|---|
| 7,653,543 B1 | 1/2010 | Blair | |
| 2008/0109224 A1 | 5/2008 | Dvorak | |
| 2009/0257484 A1* | 10/2009 | Liu .................... | H04N 21/4341 |
| | | | 375/E7.076 |
| 2012/0215532 A1 | 8/2012 | Foo | |
| 2016/0210982 A1 | 7/2016 | Sherman | |
| 2019/0122663 A1 | 4/2019 | Lowell | |
| 2021/0266682 A1* | 8/2021 | Fischer .................. | G06F 3/167 |

FOREIGN PATENT DOCUMENTS

CN 207010905 U 2/2018

OTHER PUBLICATIONS

Seetharaman Prem Prem@U Northwestern Edu et al., "VoiceAssist Guiding Users to High-Quality Voice Recordings", Human Factors in Computing Systems, ACM, 2 Penn Plaza, Suite 701NEWYORKNY10121-0701USA,May 2, 201.

* cited by examiner

*Primary Examiner* — Quynh H Nguyen
(74) *Attorney, Agent, or Firm* — Maschoff Brennan

(57) ABSTRACT

Methods implemented in a system utilizing computing programs for a speaker and a listener in conversation are provided. Aspects include (i) a reminder provisioner for a speaker which is triggered according to speed, pitch or volume of the speaker's speech, (ii) a speech training provisioner for a speaker, and (iii) an application which records and plays back difficult conversation to understand.

6 Claims, 4 Drawing Sheets

The system inputs audio data from a microphone [502]

Speech speed is measured [504]

Volume is measured [506]

Pitch is measured [508]

Do all the values fit within the threshold values [min/max]? [510]

Yes

No

The system gives a speaker a feedback [512]

FIG. 4

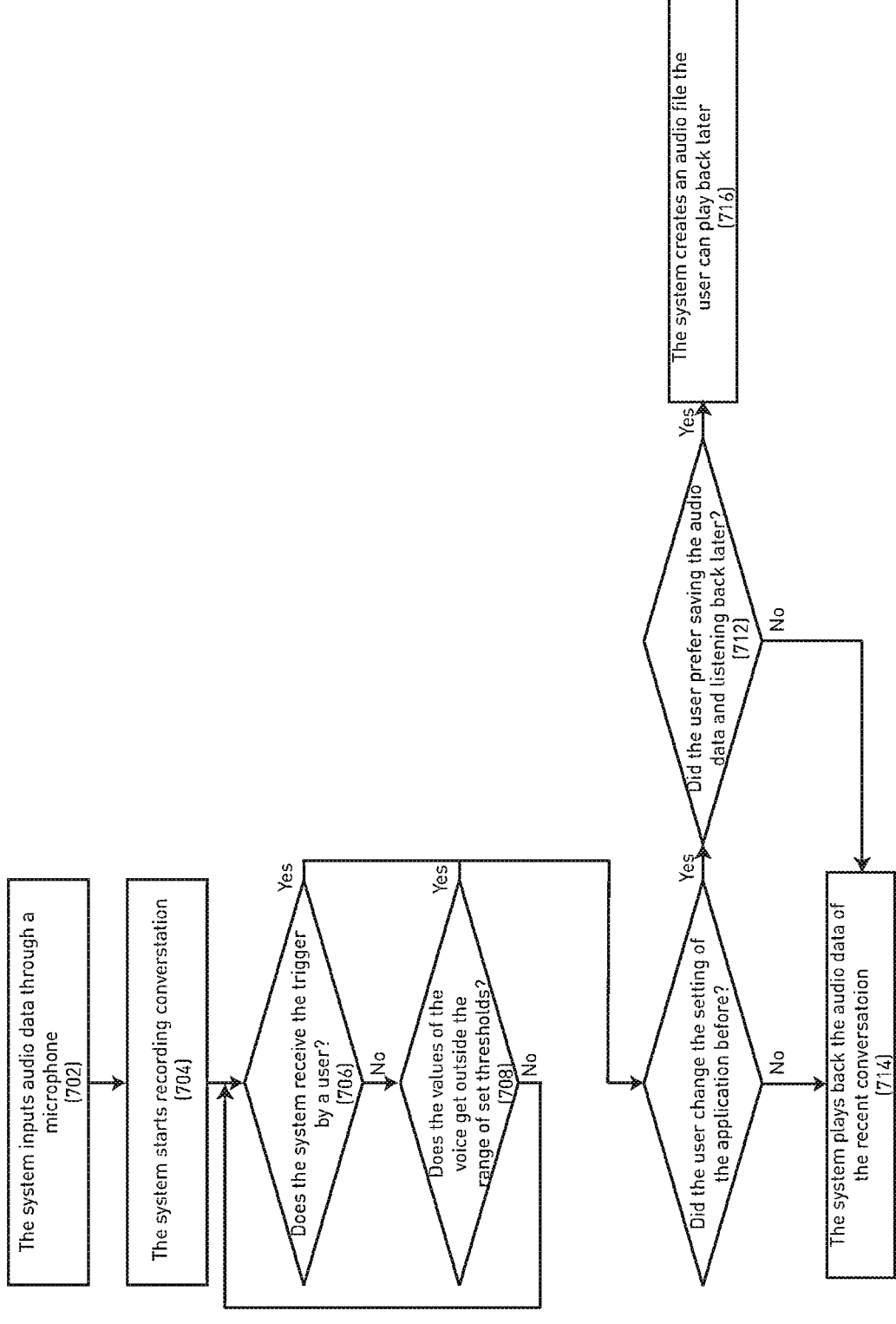

The system inputs audio data through a microphone
[702]

The system starts recording converstation
[704]

Does the system receive the trigger by a user?
[706]

Does the values of the voice get outside the range of set thresholds?
[708]

Did the user change the setting of the application before?
[710]

The system plays back the audio data of the recent conversatoion
[714]

Did the user prefer saving the audio data and listening back later?
[712]

The system creates an audio file the user can play back later
[716]

Yes

No

Yes

No

Yes

No

Yes

No

METHODS TO ASSIST VERBAL COMMUNICATION FOR BOTH LISTENERS AND SPEAKERS

BACKGROUND

Communication between hard-of-hearing people and normal hearing people can often be clunky and cause stress and frustration to both parties especially when something has to be repeated in the conversation.

While the burden in the communication should be shared by both people with hearing difficulty (as defined below) and normal hearing people, recent technological advancement seems to focus on developing surrounding 'hearing strategy', but not 'speaking strategy'. Here, it is possible to look at problem areas from the perspectives of both listeners and speakers.

For speakers, it is practically impossible to fully understand each listener's hearing difficulty as everyone hears differently. Speakers may not know how to speak properly or how their speech is understood by listeners. Also, even when people are aware of the necessity to speak more clearly in talking with a person with hearing difficulty such as hard-of-hearing person, people start to speak less clearly as conversation goes along.

From a listener's perspective, it is considered impolite in some culture to ask for repetition multiple times. Also, it becomes even more difficult to understand and ask for repetition in conversation where there are multiple people speaking.

SUMMARY

Verbal communication assisting technique implementations described herein generally assist people with hearing difficulty and people who talk with them. People with hearing difficulty, as used herein, include people with less capability in listening to conversation due to physical constrain such as far distance and obstacle, people who are not proficient enough to hear and understand in the language of the conversation or people with hearing device/technology including hearing aid, cochlear implant, born anchored hearing aid and auditory brainstem implant. The invention comprises 3 functions of a system implemented by computing programs. Firstly, the system enables a listener to let a speaker know the fact that the speaker's speech is difficult to understand by the system on behalf of the listener by evaluating speed, pitch and volume of the speech. Secondly, the system helps speakers to speak in a proper way by giving them feedback, herein the users include people with hearing impairment such as the one having sensorineural hearing loss, who could have trouble understanding how to speak. Thirdly, the system records conversation and enables user to play back or save the audio data which is difficult to understand so that users can understand the missed conversation immediately or later.

DESCRIPTION OF DRAWINGS

FIG. 4 depicts a flow diagram of an exemplary implementation, in simplified form, of a process for recording and playing back audio data of a difficult conversation part (Component 3).

DETAILED DESCRIPTION

In the following description of verbal communication assisting technique implementations reference is made to the accompanying drawings which form a part hereof, and in which are shown, by way of illustration, specific implementations in which the verbal communication assisting technique can be practiced. It is understood that other implementations can be utilized and structural changes can be made without departing from the scope of the verbal communication assisting technique implementations.

Figure 1:
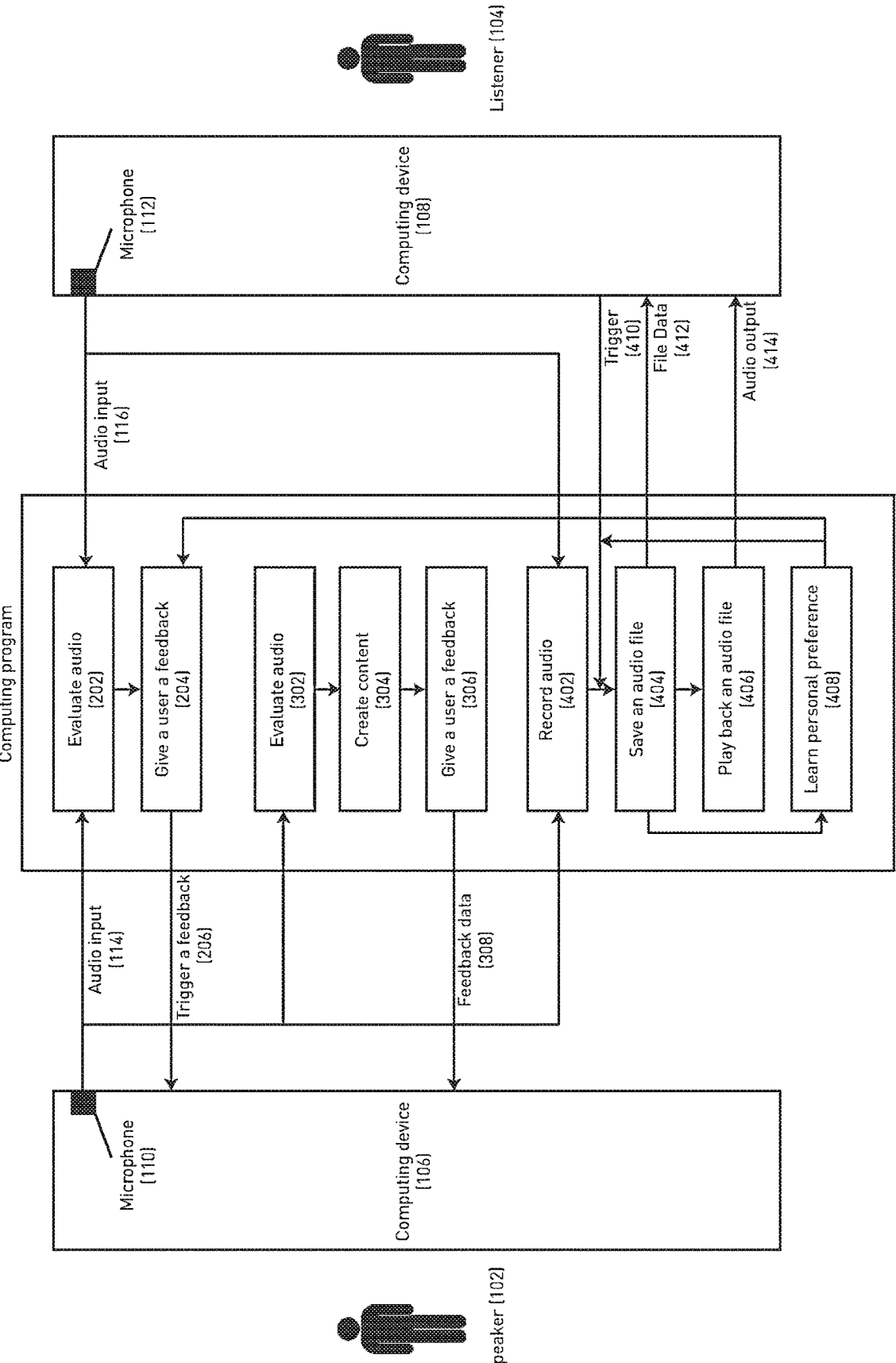
FIG. 1 is a diagram illustrating one implementation, in simplified form, of a system framework for realizing the method of verbal communication for both a speaker and a listener in conversation.

FIG. 1 illustrates one implementation, in simplified form, of a system framework which comprises of multiple components of computing programs, which function independently and also dependently with each other that shares the same database in the system.

—Component 1

The system enables a listener (104) to let a speaker (102) know the fact that the speaker's speech is difficult to understand by the system on behalf of the listener by evaluating speed, pitch and volume of the speech.

For having input, the system is operable with any type of end-user computing device (106, 108) which has a microphone (110, 112) such as a mobile phone, a portable computer, a wearable device (Apple Watch, Fitbit or Galaxy Watch among others) or a hearing device for hard-of-hearing people such as hearing aid and cochlear implant.

Upon receiving audio input (114, 116) from the microphone, a computing program in the system evaluates factors of the speech (202) as below:

Speech speed: voice data is translated into text after processing the data through transcription (audio-to-text) tool (such as Javascript SpeechRecognition API) and then the length of the text divided by the duration of speech calculates character/word per second, which can be used as a metric to evaluate the speed of speech.

Volume: voice data is translated into numeric value through a computing program such as sound volume detection program in p5.js library in JavaScript.

Pitch: voice data is translated into numeric value through a computing program such as pitch detection program in ml5.js library (CREPE) in JavaScript.

Each value is evaluated whether it is within range of minimum and maximum value and according to the evaluation, a feedback to a speaker (102) is triggered in the system (206).

In an example, the preset value for threshold values (minimum/maximum) is below, which can be configured by the user:

Speech speed (character per second): In an example of English, 3 characters per second is set as the maximum value and no value is set for minimum value.

Volume: 45 dB for minimum value and 65 dB for maximum value.

Pitch: The duration of voice whose pitch range is within 1% has to be less than 30% (maximum value). In speech-language pathology, speaking with rich tone (rich change of pitch) is considered easy for hard-of-hearing people to understand.

The configuration of the threshold value can be done manually by the user, or automatically by the system which sets preset value of normally difficult sound to understand, or learns each user's hearing preference/capability from the audio data labeled as difficult as later described in Component 3.

Upon receiving trigger information by said evaluation, the system gives feedback (204) in such ways as below:

The system gives speakers a haptic feedback through a wristband with a vibrator, a mobile phone or wearable devices (such as Apple Watch, FitBit or Galaxy Watch) which can be programmed to give vibration to user.

The system gives speakers a visual feedback by showing numeric information or graphical representation on speech speed, pitch or volume through screen or user interface computing devices have, which include mobile phone, tablets or wearable devices among others.

The system gives speakers an aural feedback by playing sound by a loudspeaker equipped in said computing devices.

Figure 2:
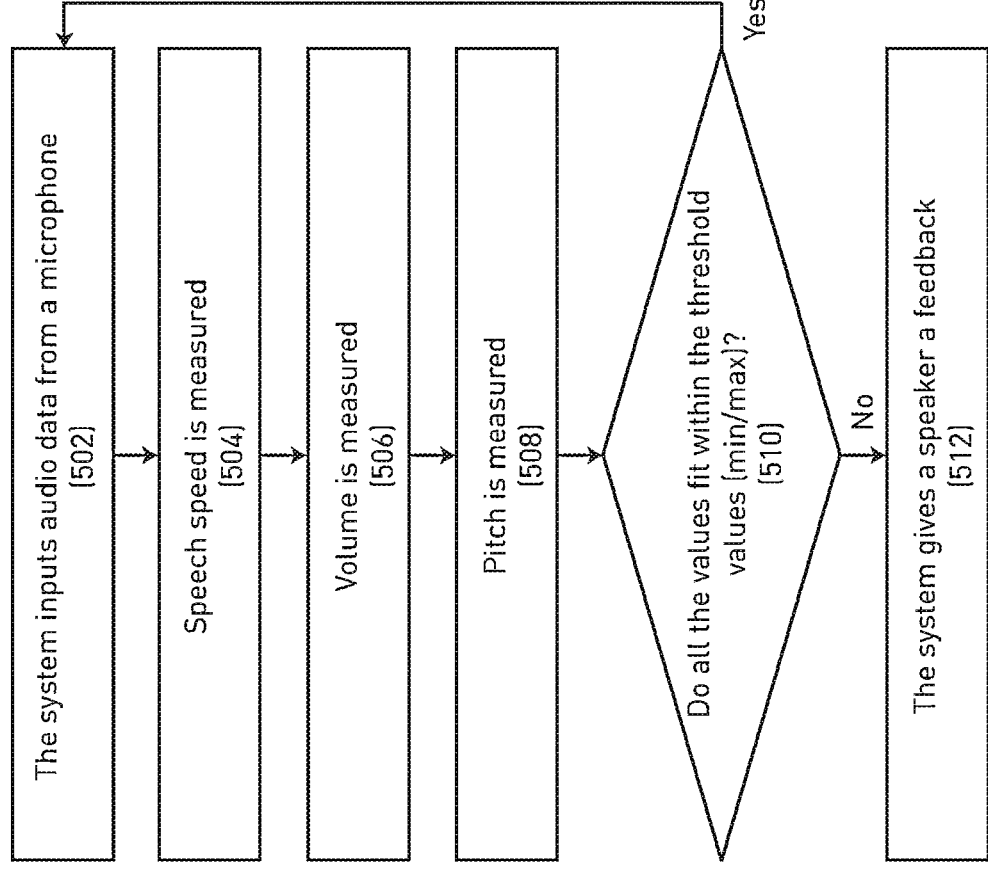
FIG. 2 depicts a flow diagram of an exemplary implementation, in simplified form, of a process for providing reminders for speakers based on data evaluation of speech (Component 1)

FIG. 2 is a flow diagram of an exemplary implementation, in simplified form, of a process for providing reminders for speakers based on data evaluation of speech. Upon receiving audio input from a microphone (502), the system measure/calculate speed (504), volume (506) and pitch (508) of the speech in said ways, and if either of the values does not fit in threshold values (minimum/max) (510), the system gives a speaker (102) a feedback in said ways (512).

—Component 2

Referring again to FIG. 1, the system visualizes pitch, speed or volume of the speech and gives a clue for a speaker (102) to understand how to speak properly or naturally so that listeners can easily understand. Especially for people having sensorineural hearing loss who could not understand the way of changing tone (pitch) of voice or speaking naturally, the visualization of pitch could be beneficial.

For having input, same as in Component 1, the system is operable with any type of end-user computing device (106, 108) which has a microphone (110, 112) such as a mobile phone, a portable computer, a wearable device (Apple Watch, Fitbit or Galaxy Watch among others) or a hearing device for hard-of-hearing people such as hearing aid and cochlear implant.

Upon receiving audio data through the microphone (114), a computing program in the system evaluates factors of the speech as below (302):

Speech speed: voice data is translated into text after processing the data through transcription (audio-to-text) tool (such as Javascript SpeechRecognition API) and then the length of the text divided by the duration of speech calculates character/word per second, which can be used as a metric to evaluate the speed of speech.

Volume: voice data is translated into numeric value through a computing program such as volume detection program in p5.js library in JavaScript.

Pitch: voice data is translated into numeric value through a computing program such as pitch detection program in ml5.js library (CREPE) in JavaScript.

According to the value measured and calculated in said ways, a computing program creates content (304) such as charts/text/numeric information or graphical object in a browser program such as Google Chrome or FireFox (306, 308). For a user test, it is considered effective to interactively control the size of a graphical object by the volume of voice or surrounding sounds, and control its color by the pitch of voice.

The system can also have a gamification element utilizing graphical object representing speaker's speaking way by preparing a set of rules or a target line to attract more interest from users such as hard-of-hearing children.

The system can further have a speech training/coaching element advising users to change or keep their way of speaking according to evaluation.

Figure 3:
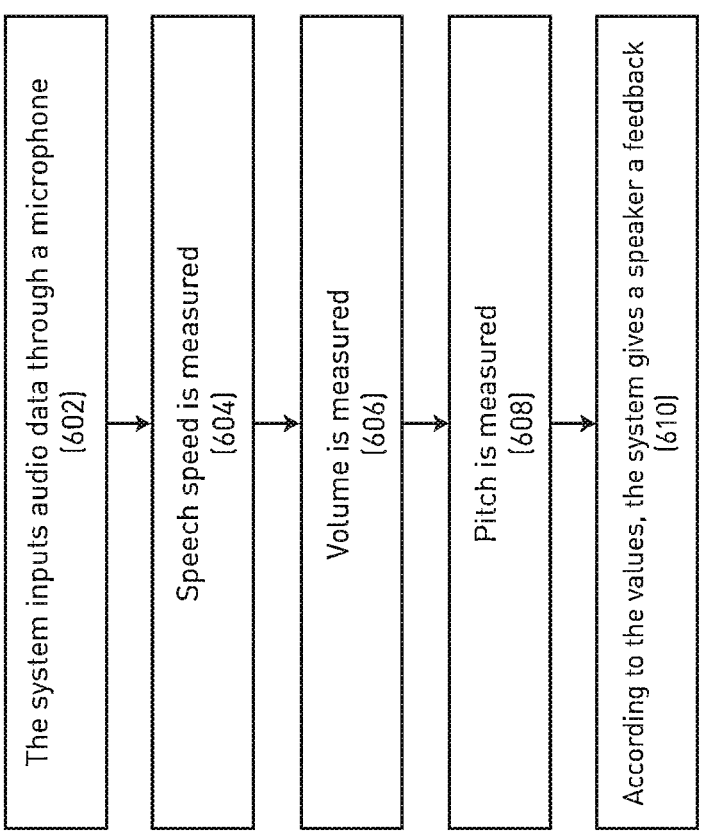
FIG. 3 depicts a flow diagram of an exemplary implementation, in simplified form, of a process for helping speakers understand how to speak properly or naturally by visualizing affecting matters (Component 2)

FIG. 3 is a flow diagram of an exemplary implementation, in simplified form, of a process for helping speakers understand how to speak properly or naturally by visualizing aspects of speech. Upon receiving audio input from a microphone (602), the system measure/calculate speed (604), volume (606) and pitch (608) of the speech in the said way and the system gives a speaker a feedback (610) in said ways, such as showing a graphical object in a screen.

—Component 3

Referring again to FIG. 1, the system enables a user to record the conversation and play back audio data of a difficult conversation part which is classified by a user or by the system.

People with hearing difficulty can suffer understanding a sentence by missing one or more words. Even if what they missed is just a few words, they could find it hard and stressful to always ask for repeating. As a solution for such difficulty, the system lets a listener (104) understand missed conversation part by herself/himself.

For having input, same as in Component 1, the system is operable with any type of end-user computing device (106, 108) which has a microphone (110, 112) such as a mobile phone, a portable computer, a wearable device (Apple Watch, Fitbit or Galaxy Watch among others) or a hearing device for hard-of-hearing people such as hearing aid and cochlear implant.

In prior to use of this technology implementation, it should be agreed on recording conversation among participants in the conversation.

Upon receiving audio input (114, 116) through a microphone, a computing program in the system records (402) and divides the audio data in multiple small blocks. The system can record and upload audio blocks to a server through a computing program such as Recorder.js in JavaScript.

In conversation, when a listener finds it hard to hear, she/he can trigger the system (410) to save (404) and play back (406) the recent audio data which is short enough to comfortably listen back (414). In a user testing, 10 seconds was considered effective for the duration of the audio data to be played back, but a user can also change the duration of a play back. Also, rather than playing back the audio right away, a user can save/mark the difficult audio and play it back later (412).

The playing back/marking timing can also be triggered automatically by the system. The system can classify the audio data a user previously played back as a difficult sound and understand a user's personal hearing capability/preference through a machine learning process (408).

When playing back, a user can change the speed, volume or pitch of the conversation so that it is easier for the user to understand.

FIG. 4 is a flow diagram of an exemplary implementation, in simplified form, of a process for recording and playing back audio data of a difficult conversation part. Upon receiving audio input from a microphone (702), the system starts recording conversation (704), and if a user triggers the system (706) or the values of the voice get outside the range of set thresholds (708), the system sets out to give a feedback. If a user has not changed setting in the application (710), the system immediately plays back the audio data of recent conversation (714). If a user has changed setting in the application (710) and if the user prefers saving the audio data and listening back later, the user can later play back an audio file the system creates (716).

The invention claimed is:

1. A system for communication for hard-of-hearing people including listeners and speakers, the system comprising:

a computing device having one or more microphones which is held by the speaker and listener, wherein the microphone is configured to receive audio data from the speaker;

one or more computing program in connection with the computing device;

the computer program is configured to evaluate the audio data received from the speaker, the received audio data is evaluated based on one or more parameters of the received audio data, including;

a) the speech speed calculated by character or word per second or other metrics, b) the pitch/frequency (Hz) and its transition, and c) the volume (dB);

the computing program is configured to evaluate the received audio data with a threshold value and the threshold value is updated, based on the data provided by the listener to the system, wherein the threshold values (minimum and maximum values) in evaluation of speakers' speech, which are utilized to determine when to give users feedback, are configured manually by users or by the system, which sets preset threshold values for usually difficult sound and the system provides personalized values according to each user's hearing capability by utilizing the previously recorded audio data labeled as difficult and training the system;

wherein the system learns each user's hearing preference and hearing capability from the audio data labeled as difficult and automatically adjusts the threshold value;

and one or more electronic device is configured to give personalized feedback to the speaker based on the evaluation of the received audio data where the feedback to the speaker includes visual representation and haptic feedback and aural feedbacks on one or more of the parameters including pitch, speed and volume of the speaker's speech, and the feedback is used for the purpose of training of the speech of the speaker, wherein the one or more computer program configured to record conversation and dividing the audio data into small blocks and storing it on a server, and wherein the server is configured to allow the listener to play back or save the audio data, that captures the conversation part that is difficult to understand for the listener, which is labeled as difficult by the system.

2. The system of claim 1, wherein a speaker gets feedback by one or more of:

a haptic feedback by vibration through an electronic device users have;

a visual feedback by screen or user interface of an electronic device users have; and an aural feedback by a speaker or an audio output device users have.

3. The system of claim 1, wherein audio data is evaluated whether it fits within range of the minimum and the maximum value with regards to one or more of speech speed, pitch and volume.

4. The system of claim 1, wherein said visualization of speaker's speech through a screen or other user interfaces, which shows one or more of:

charts, text or numeric information regarding the speaker's speech;

one of multiple graphical objects changing the color, size or shape; and content with the factor of gamification or coaching by utilizing the information regarding the speaker's speech and one of the multiple graphic object's changing color, size or shape.

5. The system of claim 1, wherein the duration of each segmented section of the speech data is set to a length that allows a listener to comfortably check or listen back to the segmented section.

6. The system of claim 1, wherein one or more of speed, pitch, and volume of the segmented speech data to be played back or saved are adjusted to provide personalized values according to a listener's hearing capability, the personalized values being further used for evaluation purposes.

* * * * *